United States Patent

[11] 3,630,662

| [72] | Inventors | Harry Brody<br>Chester, England;<br>Kenneth A. Reinhart, Summit, N.J. |
|---|---|---|
| [21] | Appl. No. | 580,191 |
| [22] | Filed | Sept. 19, 1966 |
| [45] | Patented | Dec. 28, 1971 |
| [73] | Assignee | Celanese Corporation<br>New York, N.Y. |

[54] PROCESS OF DYEING SHAPED CONDENSATION POLYMER MATERIAL IN HEATED TWO-PHASE DYE LIQUID
17 Claims, No Drawings

[52] U.S. Cl. ............................................. 8/172, 8/173, 8/178 R, 8/178 E
[51] Int. Cl. ...................................... D06p 5/06, D06p 5/04, D06p 3/24
[50] Field of Search .................................... 8/55 D, 82, 172, 173, 178 R, 166, 178 E

[56] References Cited
UNITED STATES PATENTS

| 3,206,363 | 9/1965 | Lecher et al. | 8/55 |
| 3,320,021 | 5/1967 | Guenthard | 8/55 |
| 3,334,960 | 8/1967 | Reinach | 8/88 X |
| 3,506,990 | 4/1970 | Richardson et al. | 8/178 R |

FOREIGN PATENTS

| 584,758 | 1/1947 | Great Britain | 8/55 |
| 943,147 | 11/1963 | Great Britain | 8/55 |
| 5,842 | 6/1962 | Japan | 8/55 |

OTHER REFERENCES

J. Brandrup and E. H. Immergut, " Polymer Handbook," Interscience Pub., N.Y., 1966, pps. IV- 185, 186, 216, 217, 232, 233.

Casty, R., " American Dyestuff Reporter," 1960, p. 105–117.

*Primary Examiner*—Charles L. Bowers, Jr.
*Attorneys*—D. J. De Witt, Leonard Horn and Harold L. Kauffman ABSTRACT: A method for dyeing difficulty meltable linear organic condensation polymers having nitrogen and oxygen atoms as a part of the polymer chain, particularly when such polymers are in fiber form. The method uses an aqueous dyebath, an organic solvent assist which is at most only slightly soluble in water, and a water-soluble dye which is at least partially soluble in said dye assist. A salting-out agent is utilized in the aqueous dyebath to force the dye into the organic dye assist portion, thereby facilitating a more rapid and complete exhaustion of the dyebath onto the polymer. Particularly desirable organic solvent assists are members of the group consisting of cresols and xylenols. The process is particularly useful in dyeing high-melting aromatic and cyclic aliphatic containing linear condensation polyamides, particularly those melting above 275° C., such as polyhexamethylene terephthalamide, which filaments are best formed by spinning from concentrated sulfuric acid solutions because of their high-melting points.

PROCESS OF DYEING SHAPED CONDENSATION POLYMER MATERIAL IN HEATED TWO-PHASE DYE LIQUID

This invention relates broadly to the art of dyeing shaped, synthetic, polymeric materials. More particularly it is concerned with a method of dyeing (coloring) shaped, wet-formed, difficultly meltable, condensation polymers, especially fiber-forming (fiber-formable) condensation polymers having nitrogen and/or oxygen atoms, and preferably both nitrogen and oxygen atoms, as a part of the polymer chain, e.g., high-melting polycarbonamides, particularly those melting above 275° C. such as polyhexamethylene terephthalamide.

By "difficultly meltable" polymers as used herein are meant polymers that cannot be shaped easily using melt-extrusion techniques because they tend to degrade materially and/or to polymerize further to a useless, infusible mass when heated sufficiently to melt them.

It was known prior to the present invention that polymers to which this invention is applicable could be formed into shaped articles, specifically filaments or fibers. See, for example, U.S. Pat. Nos. 3,154,512 and -612 of Parczewski; 3,154,609-Cipriani; 3,154,610-Denyes; and 3,154,613-Epstein et al., each dated Oct. 27, 1964; and 3,179,618-Roberts, dated Apr. 20, 1965. It was also known that the ease of dyeability, especially with respect to acid and disperse dyes, of the aforementioned difficultly meltable polymers could be improved by a "relaxation" treatment, for instance by treatment with certain acids in a particular range of concentrations as is disclosed and claimed in Quynn et al. copending application, Ser. No. 464,317, filed June 16, 1965 now U.S. Pat. No. 3,558,763, and assigned to the same assignee as the instant invention.

One of the deficiencies of shaped, difficultly meltable polymers is the very slow rate of diffusion of certain dyes, especially premetallized dyes, into the polymer in fiber or other form; and this is true regardless of whether or not the fiber has been relaxed by chemical or other treatment to improve its acid and disperse dye-receptivity. Since premetallized dyes are very useful in improving the resistance of dyed, shaped, synthetic polymers to light and colorfastness to washing, there has long been need for some means to utilize premetallized dyes in dyeing shaped, difficultly meltable linear, condensation polymers such as difficultly meltable polyamides and the like in filamentary (mono- and multifilaments), film, tape, ribbon, band, rod, bar or other form.

The present invention is based on my discovery that the addition of organic liquids having certain particular properties makes it possible to dye the above-described shaped polymers in an aqueous dye bath with premetallized and other dyes at materially improved rates of dyeing and dye penetration. The organic liquids (solvent assists) that are employed are solvents for the dye and are immiscible with, and at most only sparingly (slightly) soluble in, water. The invention is additionally based on my further discovery that advantageously, and hence preferably, there is also present in the dyebath a water-soluble, salting-out agent, e.g., a water-soluble sulfate, more particularly an alkali-metal sulfate and specifically sodium sulfate, in an amount sufficient to drive the dye from the aqueous phase into the organic-solvent phase.

With further reference to the matter of utilizing a salting-out agent, it may be stated that the use of such an agent is optional for dyes that are only sparingly soluble in water but necessary in the case of water-soluble dyes when certain solvent assists are employed. Generally, and as shown in examples that follow, the use of a salting-out agent is always beneficial.

A check on the suitability of a solvent can be made by observing the partition of dye, which should be soluble in water at least to some extent, between the solvent and an aqueous layer. To be effective, the solvent should contain most of the dye, and should rapidly extract the dye from the aqueous phase after mixing of the two phases. Taking Cibalan Navy Blue BL (C.I. Acid Dye No. 184) as illustrative of a premetallized dye, it was found that the aforementioned requirements for the solvent are met by certain monohydric alcohols, specifically isoamyl alcohol, n-butyl alcohol and benzyl alcohol. The dye was completely soluble in the organic phase. Finite 3-hour dyeings of fibers of polyhexamethylene terephthalamide (6-T), using 3-6 percent by volume (i.e., V/V basis) in the dyebath, gave exhausted dyebaths and almost black shades. This was a striking improvement over the control, which was only pale blue in color. It was confirmed by the use of 3 percent benzyl alcohol in the dyebath (V/V), using a wide range of premetallized dyes including the various Cibalan, Irgalan, Vialon and Neolan premetallized dyes. All gave substantially exhausted dyebaths using 4 percent dyestuff on the weight of the fiber (OWF). The outstanding merits of the method were especially evident when using Neolan premetallized dyes which previously (i.e., in the absence of the small amount of the organic solvent) had resulted merely in staining of polyhexamethylene terephthalamide fibers with the dye.

In searching for more effective solvents difficultly meltable screening on a dye partition basis using the acid dye Alizarine Sky Blue BS–CF (C.I. No. Acid Blue 78), it was discovered that in many instances the greater solubility of the acid dye in the aqueous phase prevented the solvent from extracting much dye. It was found, however, that the addition of a water-soluble salting-out agent, specifically sodium sulfate, to the dyebath changed the partition considerably. The effect of the sodium sulfate was to drive the dye into the organic phase by salting it out of the aqueous phase. Thus, this salting-out technique improved the dyeability in finite dyeings with the aforementioned acid dye when using both chlorobenzene and n-butyl Cellosolve acetate (glycol mono-n-butyl ether) as organic solvents to assist in the dyeing of fibers of polyhexamethylene terephthalamide. The use of a concentration of 40 percent n-butyl Cellosolve acetate (BCA) OWF combined with 10 percent $Na_2SO_4$ (W/W) in the dyebath gave considerably improved depths of shade with finite dyeings of a range of various Supernylite and Nylanthrene acid dyes. It was found that Supernylite Maroon LFS (C.I. No. Acid Maroon 119) gave a marked change in depth of shade when this technique was followed. Further investigation along this line, using Supernylite Maroon LFS as a typical acid dye, and Cibalan as a typical premetallized dye, led to the further discovery that the various cresols, specifically m-cresol and a commercially available mixture of m-cresol and p-cresol, which latter are generally known as m-, p-cresols (MPC), had a marked beneficial effect in improving the rate of dyeing and the dye penetration when dyebaths containing these dyes and 10 percent $Na_2SO_4$ (W/W) were used in dyeing fibers of polyhexamethylene terephthalamide.

The mechanism that takes place in the solvent-assisted dyeing with which this invention is concerned appears to be a combination of two factors or effects, both of which seem to be equally important in securing the unobvious results obtained by practicing the invention. In the first place, the solvent definitely appears to have an effect on the difficultly meltable, shaped polymer, e.g., polyhexamethylene terephthalamide in fiber form. This is evidenced by three physical changes: (1) a shrinkage of hoseleg knitted from the fiber when excess solvent-assist agent, specifically m-, p-cresols is included in the dyebath; (2) a softening of the stress-strain curve after solvent-assisted dyeing; and (3) X-ray diffraction patterns of fibers exposed to the dyebath additives including m-, p-cresols under the same conditions used in dyeing but without any dye being present. These effects seem to be consistent with that of swelling followed by relaxation. Such swelling would increase the intermolecular spacings in the fiber, and hence should greatly facilitate the passage of dye molecules, thus increasing the diffusion rate. The results of tests wherein the liquor ratio to fiber was lowered, and which showed that it was the concentration of the solvent-assist agent on the weight of the fiber that was important, is indicative of a fiber change rather than an effect on the dye in solution.

The solubility of the dye in the solvent is the second major factor. It properly may be assumed that the organic solvent forms a phase in the fiber that is very receptive to the dye; and this condition is enhanced by salting out the dye from the aqueous phase with a salting-out agent such as sodium sulfate. Hence this results in effectively increasing the capacity of the fiber for the dye.

THE SHAPED POLYMER

The shaped, difficultly meltable, condensation polymers to which the dyeing method of the present invention is applicable are preferably those fiber- and/or film-forming linear polymers having repeating =NCO— groups, more particularly —NRCO— groups where R represents hydrogen or a monovalent organic radical, e.g., a hydrocarbon radical such as a lower-alkyl radical. Such polymers include the difficultly meltable polyamides such as those wherein the —NRCO— groups are attached to carbon atoms on each side; the polyurethanes which contain repeating =NCOO— groups, more particularly —NRCOO— groups; the polyureas which contain repeating =NCON=groups, more particularly —RNCONR— groups; and similar condensation polymers.

Thus, the dyeing technique of the instant invention is most useful when applied to shaped articles formed of high-melting polymers, more particularly those melting above 275° C.; polyurethanes and polyureas melting above 179° C., especially above 210° C.; and, in general, polymers having cyclic groups such as 1,4-cyclohexylene and/or heterocyclic groups such as piperazylene or an alkyl-substituted piperazylene group, e.g., 2-(lower-alkyl) piperazylene such as 2,5-dimethyl-piperazylene, as an integral part of the polymer molecule.

Some contemplated polyamides useful in practicing this invention are, for example, those having repeating structural units of the formula

—NR—Y—NR'—CO—Y'—CO— that result from the condensation of a dicarboxylic acid or a derivative thereof, e.g., a salt, acyl halide, or ester of such an acid, with a diamine, wherein the R's, which may be the same or different, are hydrogen or monovalent organic radicals, e.g., lower alkyl such as methyl or ethyl, and the Y's, which also may be the same or different, are divalent organic radicals such as alkylene, e.g., ethylene, tetramethylene or hexamethylene, arylene such as para- and meta-xylylene, and para- and meta-diethylenebenzene, cycloalkylene such as 1,4-cyclohexylene and divalent heterocyclic radicals such as those derived from piperazine, and monoalkyl- and dialkyl-piperazines, e.g., 2-methyl- and 2,5-dimethylpiperazines and 2-ethyl- and 2,5-diethylpiperazines, wherein the open bonds are attached to nitrogen atoms, and wherein the chemical structure of the polymer and/or the polymerization technique used is such that a relatively high-melting polymer is obtained.

An important group of polyamides within the above group, and to which the present invention is especially applicable in dyeing shaped articles wet-formed therefrom, includes those in which Y and/or Y' is or contains a para- or meta-phenylene radical or a 1,4-cyclohexylene radical. Particularly important are condensation products of a diamine and terephthalic acid or a derivative of terephthalic acid, e.g., terephthalyl chloride or a dialkyl terephthalate. Some specific polymers within this latter group are poly- (polymethylene) terephthalamides wherein the polymethylene groups contain from two to 10 carbon atoms, inclusive, e.g., polyhexamethylene terephthalamide, polyoctamethylene terephthalamide, polytetramethylene terephthalamide, polyethylene terephthalamide, and polypiperazylene terephthalamide. Other polyterephthalamides are poly (o-, m-, and p-phenylene terephthalamides, poly (o-, m-, and p-diethylene-phenylene) terephthalamides, the latter produced, for example, by condensing an ester-forming derivative of terephthalic acid with para-bis(beta-aminoethyl)benzene.

The dyeing method of this invention is applicable to filaments and other shaped articles of high-melting polyamides of aromatic acids other than terephthalic acid, e.g., of isophthalic acid, 2,6-naphthalenecarboxylic acid, p,p'-dicarboxydiphenyl, (p,p'-dicarboxydiphenyl) methane, phenylenediacetic acid, phenylenedipropionic acid, and phenylenedibutyric acid. The diamine moieties of these other aromatic carboxylic acids may be the same as in the aforementioned polyterephthalamides. Illustrative, then, of polyamides other than the polyterephthalamides are the polyisophthalamides, specifically polyethylene isophthalamide. The method of dyeing of this invention also may be applied to shaped bodies made from high-melting polyamides resulting from a condensation reaction between (a) alkylene dicarboxylic acids such as adipic acid and (b) cyclic diamines such as p-xylene diamine and p-bis(amino-ethylbenzene).

Also contemplated for dyeing by the method of this invention are shaped, high-melting autocondensation polymers (e.g., those melting above 275° C.) of an aminocarboxylic acid or a lactam or other derivative of such an acid, which polymers have repeating structural units of the formula —NR—Y—CO— wherein R and Y are as defined above. Some specific polyamides melting above 275° C. within this group are polymers of the following: 1-carboxymethyl-4-aminocyclohexane or its lactam, 1-carboxy-4-aminocyclohexane or its lactam and 1-carboxymethyl-3-aminocyclopentane or its lactam.

Polyurethanes that may be dyed in accordance with this invention are polymers having repeating structural units of the formula

—NR—Y—NR'—CO—O—Y'—CO—O— and resulting, for example, from the condensation of a diisocyanate with a dihydric alcohol or phenol or the condensation of a diamine with a bis(chloroformate) of a dihydric alcohol or phenol, where the R's and Y's are as described above in connection with the polyamides, and the chemical structure of the polymer and/or the polymerization techniques used are such that a polymer melting above 179° C., preferably above 210° C., is obtained. Other polyurethanes that may be dyed by the technique of this invention are those prepared from dihydric alcohols or phenols containing a meta- or paraphenylene or a 1,4-cyclohexylene radical. Some specific, shaped polyurethanes which may thus be dyed are the condensation product of piperazine with the bis(chloroformate) of bis(p-hydroxyphenyl)propane-2,2, the condensation product of piperazine with the bis(chloroformate) of hydroquinone and the condensation product of tetramethylene diamine with the bis(chloroformate) of butanediol-1,4, each of which has a melting point above 210° C.

Polyureas to which the dyeing method of this invention is applicable include those having repeating structural units of the formula

—CO—NR—Y—NR—CO—NR'—Y'—NR'— wherein the R's and Y's are as defined above. They may be synthesized, for example, by the addition of a diisocyanate to a diamine, the condensation of a diurethane with a diamine, the condensation of a carbon oxyhalide such as phosgene with a diamine, or by heating an alpha, beta-diurea with a diamine, the chemical structure of the polymer and/or the polymerization technique being such that a polymer melting above 179° C., preferably above 210° C., is obtained. Some specific polyureas that may be dyed as herein described are those obtained from the reaction of hexamethylene diisocyanate with hexamethylene diamine and from the reaction of m-phenylene diisocyanate with m-phenylene diamine, each of which polyurea melts above 210° C.

Illustrative examples of organic solvents that may be used in practicing the present invention, in addition to those mentioned hereinbefore, are:

Xylenols in their various isomeric form including mixtures thereof
alpha-Collidine
gamma-Collidine
Quinoline
Methyl salicylate
Carolid*
n-Amyl alcohol p-nitrobenzoic acid
p-chlorobenzonitrile
Ethyl butyl ketone
3-Methoxybutanol
Dipropylene glycol
Benzylamine
Methyl para-toluate

*Carolid is a registered trademark of Tanatex Chemical Corporation. It is understood to be a self-emulsifiable, modified phenol derivative. It is anionic in character.

The amount of organic solvent may be varied considerably depending upon such influencing factors as, for example, the chosen solvent, the particular class and species of dye being used, the particular shaped polymer to be dyed, the depth of shade desired, the particular dyeing conditions employed, and other influencing factors. Thus, the amount of the organic solvent may range, by weight, from 5 percent OWF to about 300 percent OWF, when the dye level in the bath is 4 percent OWF, with corresponding variations in the permissible percentage ranges of the organic solvent when the dye level is below or above 4 percent OWF. Usually the organic solvent is present in the dyebath in an amount ranging from about 10 percent OWF to about 100 percent OWF when the dye level in the bath is 4 percent OWF as stated above. At a liquor:fiber ratio of 40:1, the use of 40 percent OWF of organic solvent corresponds to approximately 1 percent by volume of organic solvent in the bath. The liquor:fiber ratio is not limited to 40:1, but may range, for example, from 15:1 to 100:1, or 200:1, or even to infinity.

Illustrative examples of salting-out agents that advantageously (in most cases) may be employed in practicing this invention are water-soluble salts of inorganic cations such as sodium, potassium, lithium, ammonium, calcium, barium, aluminum, magnesium, iron, and the like, and anions of mineral or lower aliphatic acids such as chloride, sulfate, nitrate, phosphate, bromide, fluoride, acetate, propionate, and the like, e.g., sodium sulfate, sodium chloride, sodium nitrate, sodium acetate, sodium phosphate, potassium chloride, potassium propionate, lithium nitrate, ammonium chloride, ammonium sulfate, aluminum sulfate and the like. Advantageously there may be used salts of monovalent cations such as the alkali-metal and ammonium ions and the anions of mineral acids or lower alkanoic acids. Mixtures of salts can also be employed. Preferably sodium sulfate is employed.

The amount of salting-out agent (if employed) may be varied considerably but is usually within the range of, by weight, from about 0.5 percent to about 30 percent, more particularly about 1–20 percent and preferably about 5–15 percent, by weight of the aqueous dye liquor.

The maximum temperature of the hot aqueous dye liquor during dyeing is usually within the range of from about 80° C. to about 110° C., and the time of dyeing is generally for a period ranging from about one-half to about 3 hours.

In order that those skilled in the art may better understand how the present invention can be carried into effect, the following examples are given by way of illustration and not by way of limitation. All parts and percentages are by weight unless otherwise stated. Also, unless otherwise stated, the following description with reference to materials dyed, the dyeing procedure and the means of visually rating the dyed samples applies to all of the following examples.

Materials.  Spun yarn hoseleg samples were prepared from 4100-filament polyhexamethylene terephthalamide, 1.35 d.p.f. (denier per filament) tow, after the latter had been crimped, cut into staple length and spun into yarn. All dyeings were made on such hoseleg samples. the tensile properties of the fibers in the spun tow were 4.4 g./d. at 31 percent elongation for the "treated" fibers and 4.7 g./d. at 26 percent elongation for the untreated fibers. The "treated" fibers were fibers that had been relaxed by contacting them with an aqueous solution of sulfuric acid containing a concentration of $H_2SO_4$ within the range of from 51 percent to 58 percent by weight of the solution, as is described more fully in the aforementioned Quynn et al. copending application, Ser. No. 464,317.

Dyeing Procedure.  All dyeings were carried out in a Launder-Ometer using 3-inch by 6-inch stainless steel containers. The sample size was 5 grams. The solvents were added directly to the bath without emulsification. When salt was added, it was added before entering the hoseleg sample into the bath. The dyebaths, containing 4 percent OWF of dye, were preheated to 97° C., the fabric was added wet-out, and it was dyed for 3 hours at 97° C. The liquor ratio was 40:1. Unless specified otherwise, 2 grams per liter of ammonium acetate and 33 grams per liter of acetic acid were added to the dyebath as buffers to give a pH of 3.5.

Visual Rating of Dyed Samples.  The dyed samples were rated for shade buildup by use of a scale ranging from 1 to 10. The rating of 1 represents the shade that was achieved by the usual aqueous dyeing procedures at a pH of 3.5 while the rating of 10 represents the darker shade obtained using the best solvent assist found, viz, a mixture of meta- and para-cresols, under the optimum dyeing conditions. The ratings were made for two selected dyeing systems, namely, premetallized dyes and acid dyes, using Cibalan Blue BL (C.I. No. Acid Blue 168) as a typical example of the first, and Supernylite Maroon LFS (C.I. No. Acid Red 119) as representative of the second. A colored reproduction of the rating scale for these two dyes was prepared, with the shades for ratings of 1 to 10 in each case. The ratings in the tables of the examples that follow were obtained by a comparison with these standards. The effects of different solvents, solvent concentrations, salt concentrations, etc., are rated according to this scale. Dyebath exhaustions are rated as:

5—Complete
4—Very Good
3—Fair
2—Poor
1—Very poor

EXAMPLE 1

This example illustrates how to ascertain whether or not a particular organic solvent might be useful as a dyebath additive for improving the dye-receptivity of the shaped, difficultly meltable polymers to which the present invention is applicable, and the results of using three of such organic liquids in dyeing a fabric (hoseleg) knitted from filaments of such a polymer with a premetallized dye. the prerequisites for the suitability of such a solvent are (1) only slight solubility in water and (2) preferential solubility of the dye in the solvent as compared with water.

A preliminary test indicated that benzyl, n-butyl and isoamyl alcohols might be suitable. This test consisted in shaking up each of these alcohols with an aqueous solution of the premetallized dye Cibalan Blue BL. The possible suitability is indicated when, after separation of two immiscible layers has taken place, the major proportion (or, ideally all) of the dye is in the solvent layer; and this extraction of the dye should occur quite rapidly.

Each of the aforementioned three alcohols satisfactorily passed this test. The dye was completely and very rapidly extracted from the aqueous phase.

Finite dyeings of hoseleg knitted from spun yarn of polyhexamethylene terephthalamide (6-T) relaxed filaments were performed with the aforementioned premetallized dye using 3-6 (V/V) of each of these alcohols in the dyebath. The dyeing technique was the same as described immediately prior to the examples. The rankings of the alcohols used are given in the following table I:

TABLE I

| Solvent Assist | Cibalan Blue BL Shade | Dyebath Exhaustion |
| --- | --- | --- |
| 6% Benzyl alcohol | 9 | 5 |
| 3% Benzyl alcohol | 8 | 5 |
| 6% n-Butanol | 7 | – |
| 4% Isoamyl alcohol | 6 | – |
| 3% n-Butanol | 4 | – |

From a consideration of the results given in table I it will be noted that the use of 6 percent benzyl alcohol in the dyebath is only a little more effective than 3 percent, indicating that a plateau has been reached. From the standpoint of attaining maximum dyebath exhaustion no advantage appears to accrue in adding more of the solvent assist than that which is necessary to saturate the aqueous phase completely with the organic phase. Beyond this point, dye exhaustion decreases.

EXAMPLE 2

This example illustrates the effect of varying the concentration of a solvent assist, specifically benzyl alcohol, in the method of dyeing of this invention.

Same as in example 1 with the exception that benzyl alcohol is employed in the dyebath in concentrations (V/V) ranging from 0.25 percent to 6 percent. The results are summarized in table II.

TABLE II

| Solvent Assist | Cibalan Blue BL Shade | Dyebath Exhaustion |
|---|---|---|
| 6% benzyl alcohol | 9 | 5 |
| 3% benzyl alcohol | 8 | 5 |
| 2% benzyl alcohol | 6 | 4 |
| 1% benzyl alcohol | 5 | 4 |
| 0.5% benzyl alcohol | 3 | – |
| 0.25% benzyl alcohol | 2 | – |

It will be noted from this table that, as the amount of benzyl alcohol, was decreased through 2 percent and 1 percent, the shade became lighter, and that the beneficial effect was relatively small when 0.5 percent and 0.25 percent benzyl alcohol were used.

EXAMPLE 3

This example illustrates the use of varying amounts of two different solvent assists, viz, butyl Cellosolve acetate and chlorobenzene, as additives to dyebaths to which also had been added a salting-out agent, more particularly 10 percent (W/W) anhydrous $Na_2SO_4$. The dyes used were premetallized dye Cibalan Blue BL and acid dye Supernylite Maroon LFS. The material dyed and the dyeing procedure were otherwise the same as in examples 1 and 2. The results are summarized in table III.

TABLE III

| Solvent Assist | Shade Supernylite Maroon LFS | Shade Cibalan Blue BL |
|---|---|---|
| 4% butyl Cellosolve acetate | 8 | – |
| 2% butyl Cellosolve acetate | 7 | – |
| 1% butyl Cellosolve acetate | 7 | – |
| 0.5% butyl Cellosolve acetate | 6 | – |
| 4% chlorobenzene | 9 | 8 |
| 2% chlorobenzene | 9 | 8 |
| 1% chlorobenzene | 9 | 8 |
| 0.5% chlorobenzene | 8 | 7 |
| 0.25% chlorobenzene | 7 | 5 |

The use of 3 percent butyl Cellosolve acetate (40 percent OWF) combined with 10 percent (W/W) anhydrous $Na_2SO_4$ in the dyebath gave considerably improved depths of shade with finite dyeings (4 percent dye OWF, liquor ratio 40:1, and a dyeing time of 3 hours at 97° C.) of a wide range of acid and neutral acid dyes. Acid dye Supernylite Maroon LFS showed the most marked change in shade.

EXAMPLE 4

This example illustrates the results of screening a large number of different organic solvents to ascertain their suitability for use in dyeing 6–T filamentary material or other shaped articles comprised of wet-spun, difficultly-meltable polyamides or other polymers of this general character; and, more particularly, when such solvents are employed in the dyebath in conjunction with a salting-out agent, specifically sodium sulfate. The same two dyes, a premetallized and an acid dye, were employed as in example 3 since these two dyes are extremely sensitive to the variables employed. The results are summarized in table IV.

TABLE IV

| Solvent Assist[a] | Shade Supernylite Maroon LFS | Shade Cibalan Blue BL |
|---|---|---|
| 1% m-, p-Cresols | 10 | 10[b] |
| 1% m-Cresols | 10 | 10[b] |
| 0.25% m-Cresol | 8 | |
| 1% Collidine | 9 | 1 |
| 1% Quinoline | 9 | 3[b,d] |
| 1% Methyl salicylate | 8 | 7[b,c] |
| 0.5% Methyl salicylate | 8 | – |
| 0.25% Methyl salicylate | 7 | – |
| 1% Carolid | 6 | 10[b] |
| 0.5% Carolid | – | 10[b] |
| 0.25% Carolid | – | 8[b] |
| 1% Amyl alcohol | 7 | 7 |
| 3% p-Chlorobenzonitrile | 7 | 6 |
| 3% p-Nitrobenzoic acid | 7 | 4 |
| 1% Benzyl alcohol | 6 | 8[b] |
| 1% n-Butanol | 5 | 2 |
| 1% Ethyl butyl ketone | 5 | 2 |
| 1% 3-Methoxybutanol | 5 | 2 |
| 3% Benzylamine | 5[b] | 1[b,c] |
| 1% Methyl para-toluate | 4 | 5[b,c] |
| 1% Dipropylene glycol | 4 | 1 |

[a] Concentrations are V/V in dyebath. 1%=40% OWF.
[b] Complete dyebath exhaustion
[c] Severe color wash down
[d] Heavy spotting From a consideration of the results shown in table IV it will be noted that a cresol, more particularly m-cresol or a mixture of m- and p-cresols, gives the best results as a solvent assist in a dyeing procedure of the kind with which this invention is concerned. For economical reasons it is preferred to use a mixture of m- and p-cresols, for instance mixtures with a distilling-range specification of 2°, 3° or 5° C., including 2°, true B.P. of m- and p-cresols. Thus one may advantageously employ, for example, 3° C. m-, p-cresol containing about 55–60 percent m-cresol, since such a mixture costs only about one-fourth as much as m-cresol.

EXAMPLE 5

This example is similar to the portion of example 4 involving the use of a mixture of m- and p-cresols but differs therefrom by showing the effect of varying the concentration of the cresol mixture while maintaining the concentration of $Na_2SO_4$ constant at 10 percent $Na_2SO_4$ in the dyebath. The results are summarized in table V.

TABLE V

| Solvent assist | Supernylite Maroon LFS Shade | Supernylite Maroon LFS Dyebath exhaustion | Cibalan Blue BL Shade | Cibalan Blue BL Dyebath exhaustion |
|---|---|---|---|---|
| 1% m-, p-cresol [1] | 10 | 4 | 10 | 5 |
| 0.5% m-, p-cresol [1] | 10 | 4 | 8 | 4 |
| 0.25% m-, p-cresol [1] | 7 | 3 | 3 | 4 |
| 0.1% m-, p-cresol [1] | 6 | 2 | 2 | 3 |

[1] Concentrations are v./v. in dyebath. 1%=40% OWF.

From a consideration of the results shown in table V it will be noted that there was a marked decrease in depth of shade that was obtained below about 40 percent OWF for Cibalan Blue BL, and below about 20 percent OWF for Supernylite Maroon LFS. These levels were therefore chosen as representative of those desirable for a premetallized dye and an acid dye as in, for instance, example 6.

EXAMPLE 6

This example illustrates the results obtained when the concentration of the salting-out agent, specifically $Na_2SO_4$, is varied from a maximum of 10 percent to a minimum of 0.5 percent by weight of the dyebath. The solvent assist is the cresol mixture of isomers employed in example 5 in the percentages OWF set forth in the preceding paragraph. The results are summarized in table VI.

TABLE VI

|  | Supernylite Maroon LFS [1] | | Cibalan Blue BL [2] | |
| --- | --- | --- | --- | --- |
|  | Shade | Dyebath exhaustion | Shade | Dyebath exhaustion |
| 10% $Na_2SO_4$ | 10 | 4 | 10 | 5 |
| 7% $Na_2SO_4$ | 8 |  | 9 | 5 |
| 5% $Na_2SO_4$ | 7 |  | 8 | 5 |
| 2% $Na_2SO_4$ | 5 |  | 7 | 5 |
| 1% $Na_2SO_4$ | 4 |  | 6 | 5 |
| 0.5% $Na_2SO_4$ | 3 |  | 6 | 5 |

[1] 20% OWF m-, p-cresols.
[2] 40% OWF m-, p-cresols.

EXAMPLE 7

This example illustrates that in 3-hour dyeings at 97° C. variation in pH of the dyebath has no effect on the depth of shade with the dyes employed in the test. The same shade was obtained at both pH 3.5 and pH 6. In the usual, nonsolvent-assisted aqueous dyeings for the same time and at the same temperature, it is necessary to dye at low pH values in order to obtain medium shades. The results are summarized in table VII.

TABLE VII

|  | Shade | |
| --- | --- | --- |
| Conditions | Supernylite Maroon LFS | Cibalan Blue BL |
| pH 3.5, 40% (OWF) m-, p-cresols: | | |
| Hoselegs knitted from treated 6-T yarn | 10 | 10 |
| Hoselegs knitted from untreated 6-T yarn | 9 | 9 |
| pH 6.0, 40% (OWF) m-, p-cresols: | | |
| Hoselegs woven from treated 6-T yarn | 10 | 10 |
| Hoselegs woven from untreated 6-T yarn | 9 | 9 |

Surprisingly and unobviously, hoselegs knitted from untreated 6-T yarn could be dyed to a deep shade with Cibalan Blue BL and Supernylite LFS using 40 percent OWF of a mixture of m- and p-cresols and 10 percent $Na_2SO_4$ in the dyebath in each case. The invention thus provides a more economical means of improving the dye-receptivity of filamentary materials and other shaped articles of the kind with which this invention is concerned, as compared with the technique of improving the dye-receptivity of such articles by a chemical relaxation treatment with, for example, an organic or inorganic acid within a particular range of concentrations. Such acid treatments normally result in an appreciable loss in the strength of the fiber or other article that is thus treated, for instance, about 0.5 g./d. The dyeing technique of this invention makes possible increased productivity per spinning position, since untreated filamentary material can be spun at a greater speed than is possible in the production of treated (i.e., chemically relaxed) filamentary material and still obtain tensile properties equivalent to those of the treated filaments.

In connection with certain of the investigations described in some of the foregoing examples, it was noted that reducing the liquor ratio from 40:1 to the more practical 20:1, while keeping the concentration of the mixture of m- and p-cresols in the dyebath constant at 1 percent (V/V), but still maintaining the concentration of dye at 4 percent OWF, gave slightly lighter shades, more particularly one unit less in visual ratings. This is fairly conclusive evidence that it is the concentration of the solvent assist on the weight of the fiber that is the important factor rather than the percentage of solvent assist in the dyebath liquor, that is, as a percentage of the amount of the said liquor.

In addition to the premetallized dye and the acid dye employed in the foregoing illustrative examples approximately 80 dyes, including two dyes used in examples 1–7, were screened for shade buildup, 140° F. washfastness, and 20-hour and 40-hour lightfastness on hoselegs knitted from spun 6-T yarn of the kind employed in the other examples. These dyes were selected from the disperse, acid, neutral acid, 1:2-type premetallized acid, 1:1-type premetallized acid and vat-dye classes.

EXAMPLE 8

The procedure, which in all cases involved the use of an organic liquid as a solvent assist and a salting-out agent, specifically anhydrous $Na_2SO_4$, to drive the dye from the aqueous phase into the organic solvent phase, was as follows:

1. Dissolve the dyestuff in deionized water.
2. Bring up to volume (200 ml.) with deionized water containing 0.5 g. per liter of a nonionic surfactant, specifically Triton X–100, and a buffer salt. Heat to 60° C. (Triton X–100 is an alkylaryl polyether alcohol, specifically isooctylphenoxypolyethoxy ethanol. It is available from Rohm and Hass Company, Washington Square, Philadelphia 5, Penna.)
3. Add a previously prepared emulsion of the solvent assist while stirring vigorously. This is prepared by mixing 2 parts of the solvent assist with 1 part of a solution of 20 g. per liter of Naccolene. A paste, and diluting to a solution containing 100 g. per liter of solvent assist. (Naccolene A is a solvent-soluble, paste-form surfactant which is understood to be a modified petroleum sulfonate. It is available from Allied Chemical Corporation, National Aniline Division, 40 Rector Street, New York 6, N.Y.)
4. Add fabric wet-out; start dyeing at 60° C. Raise to 70° C. in 30 minutes.
5. Add one-half of the anhydrous $Na_2SO_4$ with good agitation. Raise the dyeing temperature to 95° C. in 30 minutes. (The stepwise addition of the salt is very important in order to maintain dyebath stability, since rapid addition of the salt will cause the solvent assist to "oil" out.)

The general dyeing procedure is the same as that described in this specification immediately prior to example 1. Other details of the conditions of dyeing with the different dyes are tabulated in table VIII.

TABLE VIII

| Dye class | Buffer salt | Solvent assist [1] (OWF), percent | Anhyd. $Na_2SO_4$, percent of solution |
| --- | --- | --- | --- |
| Disperse | None | 20 | 5–10 |
| Acid | 10% (OWF) $NaH_2PO_4$ (pH 5.5) | 20 | 5–10 |

TABLE VIII—Continued

| Dye class | Buffer salt | Solvent assist[1] (OWF), percent | Anhyd. Na$_2$SO$_4$, percent of solution |
|---|---|---|---|
| Vat (appl'd in reduced form) | None | 20 | 10 |
| Neutral acid | None | 20 | 5–10 |
| 1:2 premetallized acid (with solubilizing groups) | 10% (OWF) NH$_4$OAC (pH 6.2) | 40 | 10 |
| 1:2 premetallized acid (without solubilizing groups) | 10% (OWF) (NH$_4$)$_2$SO$_4$ (pH 5) | 40 | 10 |

[1] The solvent assist was either (a) a mixture of m- and p-cresols (MPC) such as was used in certain of the previous examples; or (b) xylenol "490" (XYL) which is available from Koppers Company, Inc., Pittsburgh, Pa.' and is a mixture of about 52% 2,4-xylenol and about 38% 2,5-xylenol.

In most cases an alkaline scour at the end of the dyeing, followed by a water rinse, drying and heat treatment at 195° C. for 4 minutes, was employed in order to remove the solvent assist and to ensure optimum washfastness and lightfastness. The scouring liquor was an aqueous solution of 10 g. per liter of caustic soda containing 1 g. per liter of an anionic surfactant, Igepon T–77, which is sodium N-methyl-N-oleoyl taurate, and is available from General Aniline & Film Corporation, Antara Chemicals Division, 435 Hudson Street, New York, 14, N.Y. Scouring was done at 60° C. for 30 using a liquor-to-fiber ratio of 40:1.

The temperature of heat treatment of the scoured shaped polymer may be near, at or slightly above the boiling temperature at atmospheric pressure of the organic solvent assist but below the softening point of the polymer. For example, the maximum temperature of heat treatment may be within the range of from 190° C. to about 210° C. when the solvent assist is a mixture of m- and p-cresols, and the shaped polymeric article is comprised of filamentary polyhexamethylene terephthalamide. The time of the heat treatment may vary, for instance, from 1 to 7 minutes or more at the heat-treating temperature.

The dyes that were tested included those set forth below. The solvent assist employed in the individual dyeings is indicated by the abbreviation MPC or XYL, the meaning of which is explained in the footnote to table VIII.

TABLE IX

| Disperse Dye | C.I. No. Disperse | Solvent Assist |
|---|---|---|
| Setacyl Yellow P-4RL | 34 | MPC |
| I/C Acetate Yellow HDLF-40 | 42 | MPC |
| Setacyl Orange P-RFL | 21 | MPC |
| Cibacet Brill. Scarlet RG | 12 | MPC |
| Eastone Red N-GLF | 35 | MPC |
| Setacyl Brill. Red P-BLN | 55 | MPC |
| Latyl Cerise N | 60 | MPC |
| Artisil Violet RFL | 29 | MPC |
| Setacyl Turquoise Blue G | 7 | MPC |
| Celanthrene Violet BGF | 8 | MPC |
| Latyl Blue FL | 27 | MPC |
| Cibacet Dark Blue RB | 55 | MPC |
| Amacron Blue RLS | 70 | MPC |
| SRA Violet Blue FS1 | 19 | MPC |
| Eastman Brill. Blue BG | 60 | MPC |

TABLE X

| Acid Dye | C.I. No. Acid | Solvent Assist |
|---|---|---|
| Kiton Fast Yellow 3GL | 11 | XYL |
| Supernylite Yellow 3G | 40 | MPC |
| Xylene Fast Orange R | 43 | XYL |
| Polar Orange G.S. Conc. | 49 | XYL |
| Anthraquinone Rubine R. Conc. | 80 | XYL |
| Supernylite Scarlet G | 85 | XYL |
| Supernylite Scarlet B | 114 | MPC |
| Supernylite Maroon LFS | 119 | MPC |
| Polar Red 3BN | 134 | XYL |
| Polar Brill. Red B Conc. | 249 | XYL |
| Supernylite Brill. Blue B | 27 | XYL |
| Alizarine Sky Blue BS-CF | 78 | MPC |
| Supernylite Navy B | 120 | XYL |
| Supernylite Green B | 27 | MPC |

TABLE XI

| 1:2 Premetallized Dyes (Dyes with Solubilizing Groups) | C.I. No. Acid | Solvent Assist |
|---|---|---|
| Irgalan Yellow GL | 114 | MPC |
| Cibalan Yellow FGL | 128 | XYL |
| Ortolan Orange R | 39 | XYL |
| Irgalan Orange RL | 86 | MPC |
| Cibalan Red 2GL | 211 | MPC |
| Irgalan Bordeaux 2BL | 218 | MPC |
| Irgalan Red 4GL | 259 | XYL |
| Cibalan Violet RL | 68 | MPC |
| Irgalan Violet 5RL | 73 | XYL |
| Irgalan Rubine RL | 75 | XYL |
| Ortolan Blue G | 151 | XYL |
| Cibalan Blue BL | 168 | MPC |
| Cibalan Navy Blue BL | 184 | XYL |
| Irgalan Navy Blue 2GL | 187 | XYL |
| Irgalan Brown 2RL | 45 | XYL |
| Ortolan Brown GG | 256 | XYL |

TABLE XII

| 1:2 Premetallized Dyes (Dyes Without Solubilizing Groups) | C.I. No. Acid | Solvent Assist |
|---|---|---|
| Vialon Fast Yellow G | 118 | MPC |
| Vialon Fast Yellow R | 119 | XYL |
| Vialon Fast Orange R | 89 | MPC |
| Vialon Fast Red B | 225 | XYL |
| Vialon Fast Copper R | 227 | XYL |
| Vialon Fast Violet B | 74 | MPC |
| Vialon Fast Violet RR | 99 | XYL |
| Vialon Fast Blue FFG | 209 | XYL |
| Vialon Fast Brown R | 50 | XYL |

TABLE XIII

| 1:1 Premetallized Dyes | C.I. No. Acid | Solvent Assist |
|---|---|---|
| Neolan Yellow 8GF | 101 | MPC |
| Neolan Orange G | 74 | MPC |
| Neolan Orange R | 76 | MPC |
| Neolan Red GRE | 183 | MPC |
| Neolan Pink BA | 186 | MPC |
| Neolan Pink B | 191 | MPC |
| Neolan Violet 3R | 56 | MPC |
| Neolan Blue 2G | 158A | MPC |
| Neolan Green BL Conc. | 12 | MPC |
| Neolan D. Green B | 35 | MPC |

TABLE XIV

| Neutral Acid Dyes (Nylanthrenes Special Nylon Dyes) | Solvent Assist |
|---|---|
| Nylanthrene Yellow FLW | XYL |
| Nylanthrene Orange SLF | XYL |
| Nylanthrene Scarlet 2GL | XYL |

| | |
|---|---|
| Nylanthrene Scarlet YLFW | MPC |
| Nylanthrene Red 4RL | MPC |
| Nylanthrene Rubine 5BLF | XYL |
| Nylanthrene Brill. Blue 3BLF | XYL |
| Nylanthrene Blue GLF | MPC |
| Nylanthrene Navy LFWF | XYL |
| Nylanthrene Green 2GFL | MPC |
| Nylanthrene Brown GRL | XYL |

TABLE XV

| Vat Dyes* | C.I. No. Vat | solvent Assist |
|---|---|---|
| Calcoloid Yellow GCD | Yellow 2 | MPC |
| Calcoloid Pink FB | Red 56 | MPC |
| Calcoloid Violet 4RD | Violet 1 | MPC |
| Calcoloid Blue BLD | Blue 6 | MPC |

*Applied in reduced form

The dyes listed in tables IX through XV were checked for shade buildup on samples of hoseleg knitted from 6-T spun yarn by dyeing with 4 percent OWF of dye. Only those dyes that showed adequate shade buildup were dyed 0.5 percent OWF and 2.0 percent OWF for lightfastness evaluation. All the various classes of dyes examined showed very good shade buildup with the exception of the 1:1 premetallized dyes and the vat dyes.

The disperse dyes (table IX) produced deep shades but the dyed hoselegs where at best only borderline when the 140° F. washfastness test was applied.

Most acid dyes (table X) and neutral acid dyes (table XIV) gave deep shades with adequate 140° F. washfastness. Fabrics of 6-T dyed with some acid, neutral acid and premetallized acid dyes satisfactorily passed a 160° F. washfastness test (reference: table XVI given later herein). In general, the AATCC lightfastness of the coloring is borderline after 20 hours' exposure. When using certain acid and neutral acid dyes, the lightfastness can be improved by 1 unit on the International Grey Scale by carrying out the dyeing in the presence of a small amount, e.g., from 0.25 to 0.5 OWF, of a suitable light absorber such as the light absorber that is available from General Aniline & Film Corporation, Antara Chemicals Division, 435 Hudson Street, New York 14, N.Y., under the name of Uvinul D-50.

Fabrics of 6-T dyed with a complete range of 1:2 premetallized acid dyes with solubilizing groups (table XI) and without solubilizing groups (table XII) were found to have excellent washfastness (140° F.) and lightfastness properties. The available evidence indicates that at least most of the dyed samples also would have passed a 160° F. washfastness test if the samples had been heat treated (without prior scouring) following dyeing. When dyeing is effected in the presence of a light absorber, care must be taken not to remove the absorber during an alkaline scour prior to heat treatment. Hence it is preferred to remove the solvent assist by heat treatment alone when light absorbers are present in the fibers.

Using a dyebath to which has been added only 10 percent by weight thereof of a salting-out agent, specifically anhydrous $Na_2SO_4$, the 1:1 premetallized dyes build to only light to moderate shades even when the pH of the dyebath is 1.5 to 2. Subsequent investigations have indicated that using higher salt concentrations, e.g., 20 or 30 percent or more by weight of the dyebath, may produce deeper shades.

Selected vat dyes (table XV) also were found to be applicable, by the method of this invention, to filamentary materials formed from difficultly meltable polymers, more particularly fabrics of polyhexamethylene terephthalamide. The shades obtained were similar to those secured when nylon-6,6, in filament, fabric or other form, is dyed with the same dyes by conventional methods. The vat-dyed samples exhibited very good washfastness and lightfastness characteristics.

Illustrative examples of acid, neutral acid and premetallized acid dyes that gave colored fabrics of polyhexamethylene terephthalamide that passed the AATCC 160° F. washfastness test are listed in table XVI together with the results of the test.

TABLE XVI.—RESULTS OF 160° F. WASHFASTNESS TESTS ON 6-T FABRICS SOLVENT-ASSIST DYED WITH VARIOUS ACID, NEUTRAL ACID AND PREMETALLIZED ACID DYES

| | Shade | 4% (OWF) dyeings | | | | | | Bath |
|---|---|---|---|---|---|---|---|---|
| | | A | C | N | S | V | W | |
| Acid dyes: | | | | | | | | |
| Supernylite Yellow 3G | 4-5 | 5 | 5 | 5 | 4-5 | 5 | 5 | Mod. |
| Supernylite Scarlet B | 4-5 | 4-5 | 3 | 3 | 3 | 3-4 | 4 | M-H. |
| Supernylite Maroon LFS | 4-5 | 5 | 4 | 3 | 3 | 5 | 3-4 | M-H. |
| Alizarine Sky Blue BS-CF | 4-5 | 5 | 5 | 2-3 | 2-3 | 5 | 3-4 | M-H. |
| Supernylite Green B | 4-5 | 5 | 5 | 3 | 3-4 | 5 | 4 | M-H. |
| Neutral Acid Dyes: | | | | | | | | |
| Nylanthrene Scarlet YLFW | 4-5 | 5 | 5 | 2-3 | 3 | 5 | 5 | Mod. |
| Nylanthrene Red 4RL | 4-5 | 4 | 3 | 1 | 3 | 3 | 3-4 | M-H. |
| Nylanthrene Blue GLF | 4-5 | 5 | 5 | 3 | 4 | 5 | 4 | L-M. |
| Nylanthrene Green 2GLF | 4-5 | 5 | 4 | 3-4 | 5 | 5 | 5 | L-M. |
| 1:2 type premetallized dyes (with solubilizing groups): | | | | | | | | |
| Irgalan Yellow GL | 4-5 | 5 | 5 | 5 | 5 | 5 | 5 | Light. |
| Irgalan Orange RL | 4-5 | 5 | 5 | 5 | 5 | 5 | 5 | Do. |
| Cibalan Red 2BL | 4-5 | 5 | 5 | 4 | 5 | 5 | 5 | Do. |
| Irgalan Bordeaux 2BL | 4-5 | 5 | 5 | 3 | 5 | 5 | 5 | Do. |
| Cibalan Violet RL | 4-5 | 5 | 5 | 3 | 5 | 5 | 5 | Do. |
| Cibalan Blue BL | 4-5 | 5 | 5 | 3 | 5 | 5 | 5 | Do. |
| 1:2 type premetallized dyes (without solubilizing groups): | | | | | | | | |
| Vialon Yellow G | 4-5 | 5 | 5 | 5 | 5 | 5 | 5 | Do. |
| Vialon Orange R | 4-5 | 5 | 5 | 3-4 | 4 | 5 | 5 | Do. |
| Vialon Violet B | 4-5 | 5 | 5 | 2-3 | 5 | 5 | 5 | Do. |

The test for colorfastness to washing is the same as Test No. III of Standard Test Method AATCC 36–1965, which is a 160° F. washfastness test. The 140° F. washfastness test that has been mentioned previously herein is the same test for colorfastness to washing with the exception that a temperature of 140° F. is used instead of 160° F. The legend applicable to table XVI (degree of changes indicated by the International Grey Scale) is as follows:

| | |
|---|---|
| 5—No change | A—Acetate |
| 4—Slight | C—Cotton |
| 3—Moderate | N—Nylon |
| 2—Marked | S—Silk |
| 1—Severe | V—Viscose |
| | W—Wool |

As routinely conducted, this test includes the use of a so-called "stain cloth" which is subjected to the same conditions as the sample. This stain cloth, which is a small fabric swatch, is composed of narrow woven strips (originally undyed) of various types of fibers (acetate, cotton, nylon, etc.; hence "A," "C," "N," etc.). The purpose is to determine where the dyestuff (if it bleeds out of the test samples) migrates; that is, to determine the tendency for dye or color transference. The bath liquid, at the end of the test, is rated by language that will indicate the relative amount of dyestuff that had bled out of the dyestuff and was still remaining in the bath. For example, "Heavy" would mean that a considerable amount of dyestuff had bled out of the sample and was still in the bath. In the column headed "Bath" table XVI, the abbreviations "Mod." mean moderate; "M-H," medium to heavy; and "L-M," light to medium. The stain cloth is a fairly sensitive means for assessing colorfastness to washing. The rankings 1, 2, 3, 4 and 5, and terms such as "Clear," "Moderate" and "Heavy," and terms having intermediate meanings, represent qualitative judgments of one who is trained and experienced in making the observations. The term "Light" is used to indicate a bath coloration intermediate "Clear" and "Moderate."

EXAMPLE 9

This example illustrates the beneficial effects of an alkaline scour followed by heat treatment when applied to hoselegs knitted from 6-T spun yarn. The conditions of scouring and heat treating were the same as those described under example 8 (immediately prior to table IX). Control samples that had been dyed in the same manner but had not been scoured and heat treated were subjected to identically the same test conditions. The hoselegs were dyed with a variety of disperse dyes, acid dyes and neutral acid dyes in the same manner as described under example 8, using MCP or XYL as the solvent assist and anhydrous sodium sulfate as the salting-out agent.

The dyes employed and the results of the tests are shown in table XVII. It will be noted that at ratings of less than 5 (International Grey Scale) for the individual stain cloth there is, in general, an improvement in the rating of 1 unit in the scale for the test samples that had been scoured and heat treated after dyeing as compared with those samples to which these treatments had not been applied.

Table XVII follows.

hereinbefore, for instance under the subheading "Dyeing Procedure." The dyes used were premetallized dye Cibalan Blue BL and acid dye Supernylite Maroon LFS. In dyeing with Cibalan Blue BL the amount of MPC solvent assist was 1 volume-percent of the bath or 40 percent OWF; while with Supernylite Maroon LFS, the amount of MPC solvent employed was 0.5 volume-percent of the bath or 20 percent OWF. The results of shade buildup and dyebath exhaustion are shown in table XIX which follows.

TABLE XIX

| Dyebath modifications | Supernylite Maroon LFS | | Cibalan Blue BL | |
|---|---|---|---|---|
| | Shade | Exhaustion | Shade | Exhaustion |
| a. Control (i.e., no solvent assist and no salting-out agent). | 5 | 1-2 | 1 | 2 |
| b. MPC as a solvent assist but no salting-out agent such as anhydrous Na$_2$SO$_4$. | 6 | 2 | 5 | 5 |
| c. 5% Na$_2$SO$_4$ plus MPC | 8 | 4 | 8 | 5 |
| d. 10% Na$_2$SO$_4$ plus MPC | 10 | 4 | 10 | 5 |

The technique for determining shade buildup has been described previously under the subheading "Visual Rating of Dyed Samples." Comments also have been made (immediately prior to example 1) descriptive of the meaning of the numerical ratings for dyebath exhaustion.

Washfastness tests at 140° F. of the dyed hoselegs showed that although the dyed samples of (b), (c) and (d) were dyed to deeper shades than the controls, they possessed a washfastness equivalent to that of the light shades of the control samples.

TABLE XVII.—RESULTS OF 140° F. WASHFASTNESS TESTS ON 6-T FABRICS SOLVENT-ASSIST DYED WITH VARIOUS DYES, AND WITH AND WITHOUT SUBSEQUENT SCOURING AND HEAT-TREATMENT

| | Code* | Shade | 4% (OWF) Dyeings | | | | | | Bath |
|---|---|---|---|---|---|---|---|---|---|
| | | | A | C | N | S | V | W | |
| Disperse dyes: | | | | | | | | | |
| I/C Yellow HDLF-40 | NT | 4-5 | 3 | 5 | 2-3 | 3 | 5 | 3 | Heavy. |
| | T | 4-5 | 4 | 5 | 4 | 4 | 5 | 4-5 | Mod. |
| Cibacete Brilliant Scarlet RG | NT | 4-5 | 3 | 5 | 2 | 3 | 5 | 3 | Heavy. |
| | T | 4-5 | 4 | 5 | 3+ | 4 | 5 | 4-5 | Mod. |
| Eastone Red N-GLF | NT | 4-5 | 2 | 5 | 2 | 2 | 5 | 4 | Heavy. |
| | T | 4-5 | 3 | 5 | 3+ | 5 | 5 | 5 | Mod. |
| Celanthrene Violet BGF | NT | 4-5 | 3 | 5 | 2-3 | 4 | 5 | 5 | M-H. |
| | T | 4-5 | 4 | 5 | 3 | 4-5 | 5 | 5 | L-M. |
| Latyl Blue FL | NT | 4-5 | 5 | 5 | 2-3 | 3-4 | 5 | 3-4 | M-H. |
| | T | 4-5 | 5 | 5 | 3 | 4 | 5 | 4 | L-M. |
| Acid and neutral acid dyes: | | | | | | | | | |
| Supernylite Scarlet G | NT | 4-5 | 5 | 3 | 4 | 3 | 4 | 5 | Mod. |
| | T | 4-5 | 5 | 4 | 5 | 4 | 4 | 5 | Mod. |
| Polar Red BN | NT | 4-5 | 5 | 4 | 5 | 3 | 5 | 3-4 | M-H. |
| | T | 4-5 | 5 | 5 | 5 | 5 | 5 | 5 | Light. |
| Polar Brilliant Red B Concentration | NT | 4-5 | 5 | 3 | 4 | 3-4 | 3-4 | 5 | Mod. |
| | T | 4-5 | 5 | 4 | 5 | 5 | 4 | 5 | Mod. |
| Anthraquinone Rubine R concentration | NT | 4-5 | 5 | 5 | 5 | 3 | 5 | 5 | Light. |
| | T | 4-5 | 5 | 5 | 5 | 5 | 5 | 5 | Do. |
| Nylanthrene Scarlet 2GL | NT | 4-5 | 5 | 3 | 1-2 | 3 | 3-4 | 4 | M-H. |
| | T | 4-5 | 5 | 4 | 3 | 4 | 4 | 5 | Mod. |
| Nylanthrene Rubine 5BLF | NT | 4-5 | 5 | 3-4 | 2 | 3 | 4 | 4 | M-H. |
| | T | 4-5 | 5 | 4 | 3-4 | 5 | 5 | 5 | Mod. |
| Nylanthrene Brilliant Blue 3BLF | NT | 4-5 | 5 | 5 | 1-2 | 3 | 4-5 | 2-3 | M-H. |
| | T | 4-5 | 5 | 5 | 3 | 4 | 5 | 4 | Mod. |
| Nylanthrene Brown GRL | NT | 4-5 | 5 | 2-3 | 2 | 3-4 | 3-4 | 5 | M-H. |
| | T | 4-5 | 5 | 3-4 | 3 | 5 | 4 | 5 | Mod. |

EXAMPLE 10

This example is illustrative of the comparable results of dyeing a knitted hoseleg of 6-T filamentary material using four different variations of dyebath composition (a) normal conditions, i.e., in the absence of both a solvent assist and a salting-out agent; (b) in the presence of a solvent assist, specifically MPC, but in the absence of a salting-out agent; (c) in the presence of both MPC and 5 percent of a salting-out agent, specifically anhydrous sodium sulfate; and (d), same as in (c) but using 10 percent of anhydrous sodium sulfate in the dyebath. Other dyeing conditions, e.g., time, temperature, etc., were substantially the same.

The procedure was essentially the same as that described

EXAMPLE 11

This example is similar to example 10 from which it differs by using in the dyebath either 5 percent or 10 percent NaCl as a salting-out agent instead of anhydrous sodium sulfate. Either 20 percent or 40 percent OWF of MPC was used, respectively, with Supernylite Maroon LFS and Cibalan Blue BL dyes. The results of shade buildup and dyebath exhaustion are shown in table XX which follows:

TABLE XX

| Dyebath modifications | Supernylite Maroon LFS | | Cibalan Blue BL | |
|---|---|---|---|---|
| | Shade | Exhaustion | Shade | Exhaustion |
| MPC as a solvent assist | 6 | 2 | 5 | 5 |

Table XX – Continued

| Dyebath modifications | Supernylite Maroon LFS | | Cibalan Blue BL | |
|---|---|---|---|---|
| | Shade | Exhaustion | Shade | Exhaustion |
| but no salting-out agent such as NaCl | | | | |
| MPC plus 5% NaCl | 7 | 3 | 7 | 5 |
| MPC plus 10% NaCl | 9 | 4 | 9 | 5 |

For a comparison with a control (i.e., no solvent assist and no salting-out agent) and baths containing either 5 percent or 10 percent $Na_2SO_4$ in addition to MPC, see the respective shades and dye exhaustions of (a) (c) and (d) in table XIX.

EXAMPLE 12

This example is similar to example 10 with the exception that only Cibalan Blue BL was used as a dye and there was employed in the dyebath either 4 percent, 8 percent or 16 percent alum, $(Al_2SO_4)_3 \cdot 18H_2O$, as a salting-out agent instead of anhydrous sodium sulfate. The amount of MPC used was 40 percent OWF. The results of shade buildup and dyebath exhaustion are shown in table XXI which follows. For ease of comparison with the results obtained when MPC and 5 percent or 10 percent anhydrous sodium sulfate are employed (see table XIX), the latter results are also included in table XXI.

TABLE XXI

| Dyebath Modifications | Cibalan Blue BL | |
|---|---|---|
| | Shade | Exhaustion |
| MPC as a solvent assist but no salting-out agent such as alum | 5 | 5 |
| MPC plus 4% alum | 6–7 | 5 |
| MPC plus 8% alum | 8 | 5 |
| MPC plus 16% alum | 10 | 5 |
| MPC plus 5% anhydrous $Na_2SO_4$ | 8 | 5 |
| MPC plus 10% anhydrous $Na_2SO_4$ | 10 | 5 |

It will be understood, of course, by those skilled in the art that our invention is not limited to the use of the specific dyes, solvent assists (dyeing aids or assistants), salting-out agents, times, temperatures, concentrations and other conditions of dyeing and after-scouring as given in the foregoing examples by way of illustration. Likewise, the invention is not limited to the solvent-assisted dyeing of only filaments of polyhexamethylene terephthalamide (6–T) in fabric (knitted or woven) form; or in nonwoven form such as in the form of a felt or mat; or in tow or other form. For example, one may similarly dye films, filaments, or other shaped articles of the polyisophthalamides, e.g., polyethylene isophthalamide, polyhexamethylene isophthalamide, or of any other shaped, difficultly meltable polymer of the kind with which this invention is concerned and of which numerous examples have been given hereinbefore both broadly and specifically.

It is to be understood that the foregoing detailed description is given merely by way of illustration and that many variations may be made therein without departing from the spirit of the invention.

The embodiments of the invention in which an exclusive property or privilege is claimed are defined as follows:

1. The process of coloring a shaped, wet-formed, difficultly meltable, linear, condensation polymer having nitrogen and oxygen atoms as a part of the polymer chain selected from the group consisting of aromatic-containing polyamides, polyurethanes and polyureas, said method comprising:
    A. contacting the said polymer with hot aqueous dye liquor containing a water-soluble dye and an organic solvent assist which is at most only slightly soluble in water but in which the dye is soluble at least to some extent, selected from the group consisting of xylenols, cresols, alpha-collidine, gamma-collidine, quinoline, benzyl alcohol, n-butanol, methyl salicylate, n-amyl alcohol, p-nitrobenzoic acid, p-chlorobenzonitrile, ethyl butyl ketone, 3-methoxybutanol, dipropylene glycol, benzylamine, and methyl para-toluate, the amount of the said solvent assist not exceeding substantially that amount which is necessary to saturate the aqueous phase completely with the said assist;
    B. concurrently with step A contacting the dye in the dye liquor with a water-soluble salting-out agent of a kind and in an amount effective in driving the dye from the aqueous phase into the organic solvent assist; and
    C. continuing the dyeing of the shaped polymer in contact with the dye liquor at an elevated temperature until optimum coloring has been attained by the said polymer.

2. The process as in claim 1 wherein the shaped polymer is in filamentary form, and the organic solvent assist is at least one member of the group consisting of the cresols and the xylenols.

3. The process as in claim 2 wherein the organic solvent assist is a cresol.

4. The process as in claim 3 wherein the cresol is a mixture of meta- and para-cresols.

5. The process as in claim 2 wherein the organic solvent assist is a xylenol.

6. The process as in claim 1 wherein the shaped polymer is in filamentary form, and the water-soluble salting-out agent is a water-soluble salt of an inorganic cation with an anion of a mineral acid or a lower aliphatic acid.

7. The process as in claim 6 wherein the water-soluble salt is sodium sulfate.

8. The process as in claim 1 wherein the shaped polymer is in filamentary form, an the polymer in a filamentary form is contacted with the hot aqueous dye liquor by immersion in a bath of the said liquor.

9. The process as in claim 1 wherein the shaped polymer is filamentary polycarbonamide having a melting point above 275° C.; the said filamentary polycarbonamide is contacted with the hot aqueous dye liquor by immersion in a bath of the said liquor; and the water-soluble salting-out agent is a water-soluble salt of an inorganic cation with an anion of a mineral acid.

10. The process as in claim 1 wherein the shaped polymer is a polyterephthalamide in filamentary form; the said filamentary terephthalamide is contacted with the hot aqueous dye liquor by immersion in a bath of the said liquor; the organic solvent assist is at least one member of the group consisting of the cresols and the xylenols; and the water-soluble salting-out agent is a water-soluble salt of an inorganic cation with an anion of a mineral acid.

11. The process as in claim 10 wherein the dye in the hot aqueous dye liquor is a member of the group consisting of acid dyes, neutral acid dyes, and 1:2-type premetallized acid dyes.

12. The process as in claim 11 wherein the maximum temperature of the hot aqueous dye liquor during dyeing is within the range of about 80° to about 110° C.; the time of dyeing is for a period ranging from about one-half to about 3 hours; the amount of the solvent assist ranges, by weight, from 5 percent OWF to about 300 percent OWF when the concentration of the dye in the said liquor is 4 percent OWF, with corresponding variations in the permissible ranges of the said solvent assist when the dye concentration is below or above 4 percent OWF; and the water-soluble salting-out agent constitutes from about 0.5 percent to about 30 percent by weight of the aqueous dye liquor.

13. The process as in claim 12 wherein the water-soluble salting-out agent is added in increments to the bath of aqueous dye liquor.

14. The process as in claim 10 wherein the polyterephthalamide in filamentary form is polyhexamethylene terephthalamide in filamentary form.

15. The process as in claim 1 which includes the additional steps, after step C, of applying an alkaline scour to the colored shaped polymer, washing the scoured polymer to remove excess alkali, and heat treating the washed polymer near, at or slightly above the boiling temperature at atmospheric pressure of the organic solvent assist but below the softening point of the polymer.

16. The process as in claim 15 wherein the colored shaped polymer is colored filamentary polyhexamethylene terephthalamide, and the washed polymer is heat treated at a maximum temperature within the range of from about 190° to about 210° C.

17. The process of coloring a shaped article comprising filaments of a wet-spun, difficulty meltable, linear condensation polyterephthalamide which comprises:

A. immersing the said shaped article in a hot aqueous dye bath containing a water soluble dye,
  a. an organic solvent assist selected from the group consisting of cresols and xylenols, the amount of the said solvent assist not exceeding substantially that amount which is necessary to saturate the aqueous phase completely with the said assist; and
  b. a water-soluble salting-out agent of a kind and in an amount effective in driving the dye from the aqueous phase into the organic solvent assist,
  said salting-out agent being added in increments to the said aqueous dye bath; and
B. continuing the dyeing of the said shaped article in the said hot aqueous dye bath until optimum coloring has been attained by the said article.

* * * * *

PO-1050
(5/69)

UNITED STATES PATENT OFFICE
CERTIFICATE OF CORRECTION

Patent No. __3,630,662__   Dated __December 28, 1971__

Inventor(s) __Harry Brody and Kenneth A. Reinhart__

It is certified that error appears in the above-identified patent and that said Letters Patent are hereby corrected as shown below:

In column 8, TABLE IV, under the column entitled "Cibalan Blue BL" and under "$10^b$", second instance, insert ---2---;

In column 8, TABLE IV, under the column entitled "Solvent Assist$^a$", in the fourth line, remove the number "2";

In column 8, line 53, after "including", insert ---the--- and cancel "2°";

In column 14, line 17, after "from", insert ---wet spun---;

In column 14, TABLE XVI, under the heading "S", change the "4" which appears as the next-to-last figure in that column, to ---5---.

Signed and sealed this 11th day of July 1972.

(SEAL)
Attest:

EDWARD M. FLETCHER, JR.
Attesting Officer

ROBERT GOTTSCHALK
Commissioner of Patents